INVENTOR.
Roy H. Brandes
BY Spencer Hardman & Fehr
his attorneys

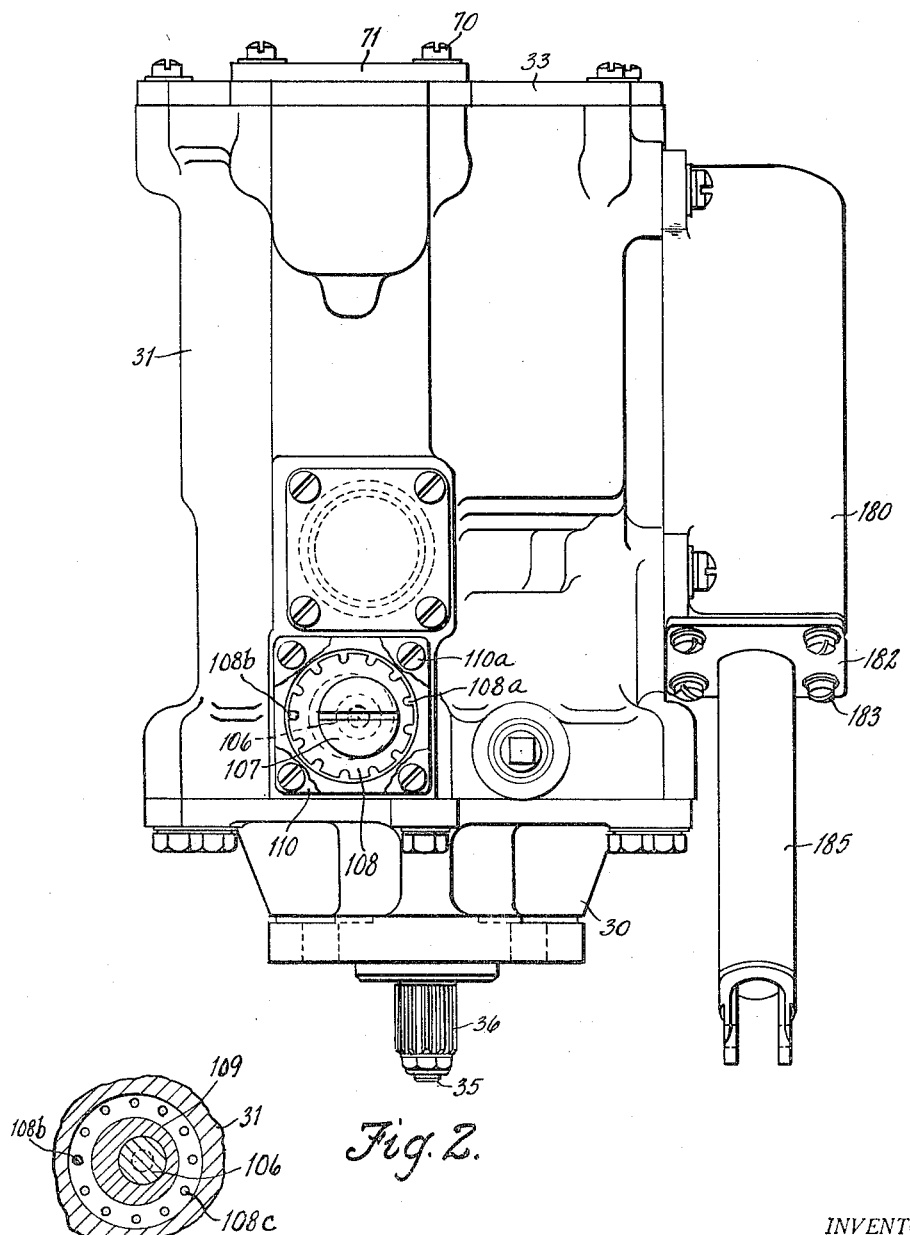

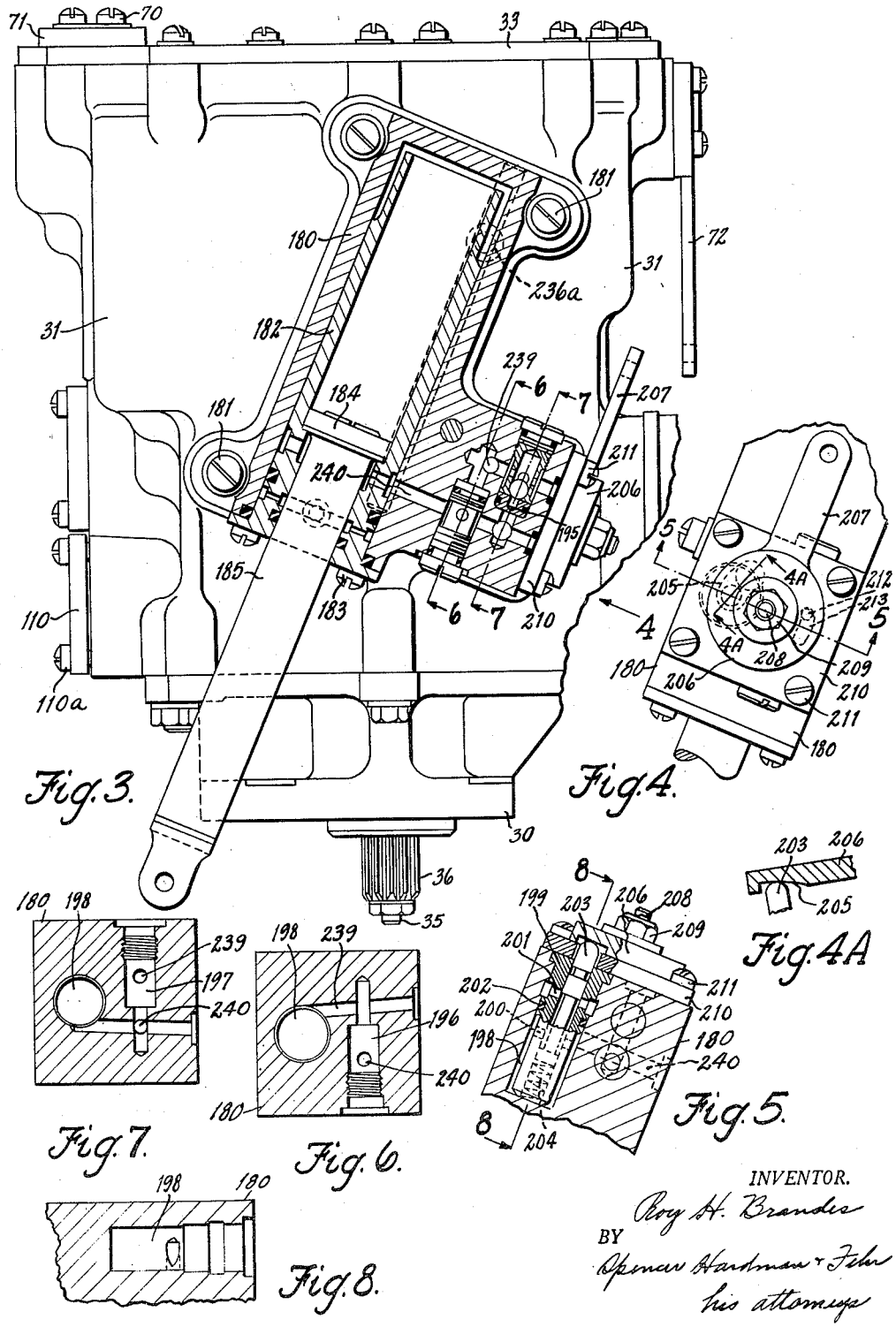

March 6, 1951     R. H. BRANDES     2,544,131
SPEED RESPONSIVE PROPELLER PITCH CONTROLLER
Filed April 10, 1948     9 Sheets-Sheet 4

INVENTOR.
Roy H. Brandes
BY Spencer Hardman John
his attorney

March 6, 1951 R. H. BRANDES 2,544,131
SPEED RESPONSIVE PROPELLER PITCH CONTROLLER
Filed April 10, 1948 9 Sheets-Sheet 5

INVENTOR.
Roy H. Brandes
BY
Spencer Hardman & Fehr
his attorneys

March 6, 1951 R. H. BRANDES 2,544,131
SPEED RESPONSIVE PROPELLER PITCH CONTROLLER
Filed April 10, 1948 9 Sheets-Sheet 6

INVENTOR.
Roy H. Brandes
BY
Spencer Hardman & Fisher
his attorneys

March 6, 1951 R. H. BRANDES 2,544,131
SPEED RESPONSIVE PROPELLER PITCH CONTROLLER
Filed April 10, 1948 9 Sheets-Sheet 7

INVENTOR.
Roy H. Brandes
BY
Spencer Hardman & Fehr
his attorneys

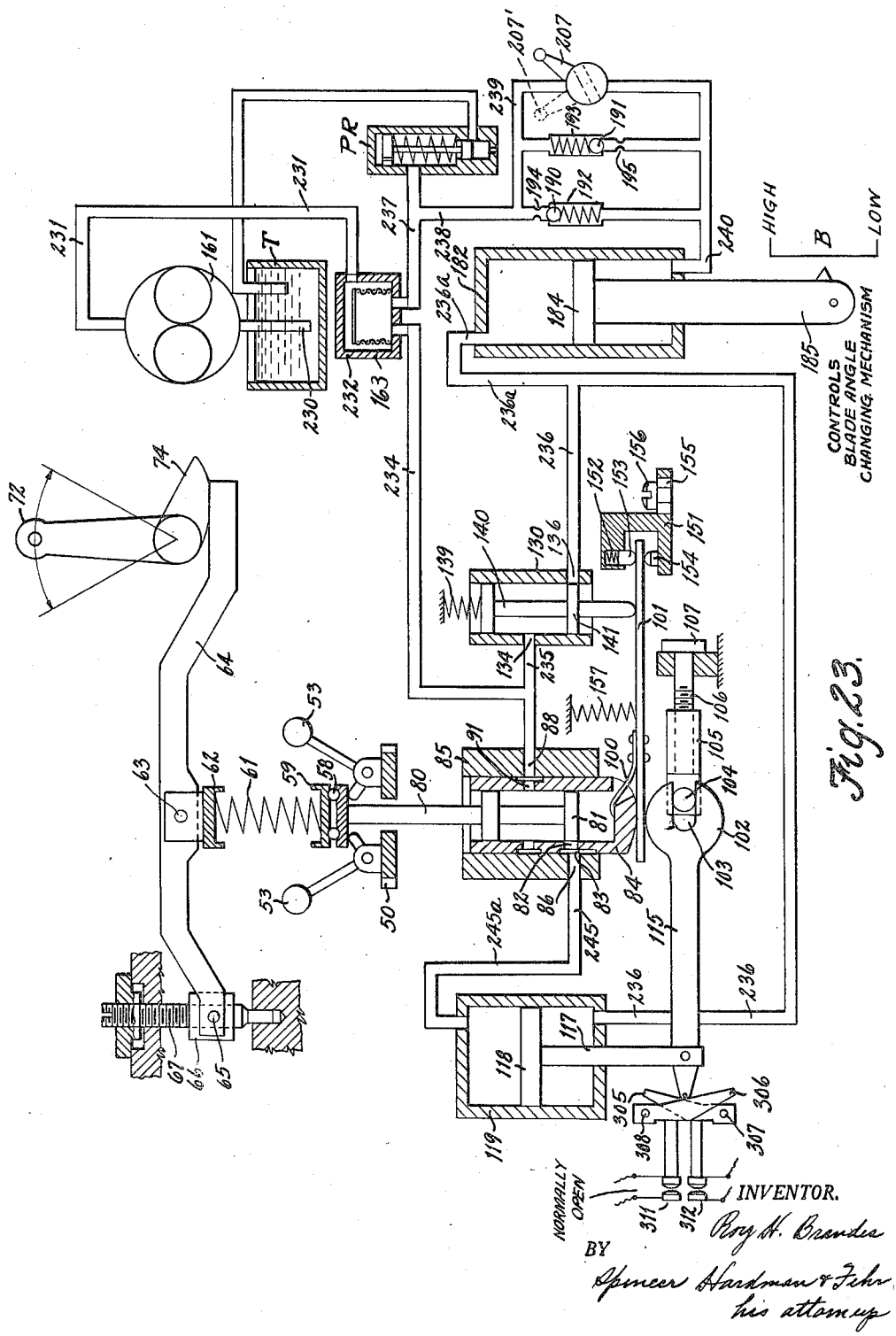

Patented Mar. 6, 1951

2,544,131

UNITED STATES PATENT OFFICE 2,544,131

SPEED RESPONSIVE PROPELLER PITCH CONTROLLER

Roy H. Brandes, Dayton, Ohio, assignor to General Motors Corporation, Detroit, Mich., a corporation of Delaware Application April 10, 1948, Serial No. 20,282

5 Claims. (Cl. 264—14)

This invention relates to stabilized control of propeller blade angle for the purpose of governing the speed of the engine which drives the propeller, and more particularly to a controller comprising a blade angle controlling hydraulic servo having a cylinder, a piston therein and a rod connected with the piston and extending through one end of the cylinder and connectible with blade angle changing mechanism, a fluid reservoir, a pump connected with the reservoir for supplying fluid under pressure, means connecting the pump with the rod end of the servo-cylinder, a flyweight governor, means for driving the pump and governor, a stabilizer cylinder, a piston therein, a rod extending from the piston through one end of said cylinder, a lever connected with said stabilizer piston rod, a fulcrum for said lever, a duct connecting one end of the stabilizer cylinder with the head end of the servo-cylinder, means for controlling admission of pressure fluid from the pump to the other end of the stabilizer cylinder or the draining thereof and comprising a valve connected with the governor and a follow-up valve operated by the lever, means for controlling admission of pressure fluid from the pump to the head end of servo-cylinder or the draining thereof and comprising a third valve and a second lever operated by the first lever for operating said third valve and a fulcrum for the second lever.

An object of this invention is to provide for adjustment of the fulcrum of the levers of the controller for various purposes, namely, to effect longitudinal adjustment of the follow-up valve so that flow of fluid into or out of one end of the stabilizer cylinder will be blocked when the governor is on speed, to control the degree of sensitivity of the controller to rate of change of speed error and to control the degree of sensitivity of the controller to the amount of speed error.

An object of the invention is to provide either for slow or for rapid action of the controller in response to the setting of an action-selecting member under control by the pilot.

A further object is to provide means operated by the controller for controlling electrical circuits which cause operation of devices which indicate to the pilot the existence of overspeed or underspeed which the controller can correct either slowly or rapidly as the pilot may choose by operation of the action-selecting means.

Further objects and advantages of the present invention will be apparent from the following description, reference being had to the accompanying drawings, wherein a preferred embodiment of the present invention is clearly shown.

In the drawings:

Fig. 2 is a view of the opposite side of the controller.

Fig. 2A is a sectional view on line 2A—2A of Fig. 17.

Fig. 3 is a sectional view on line 3—3 of Fig. 1.

Fig. 4 is a fragmentary view in the direction of arrow 4 of Fig. 3.

Fig. 4A is a sectional view on line 4A—4A of Fig. 4.

Fig. 5 is a sectional view on line 5—5 of Fig. 4.

Figs. 6 and 7 are sectional views on lines 6—6 and 7—7 respectively of Fig. 3 with valve parts removed.

Fig. 8 is a sectional view on line 8—8 of Fig. 5 with valve parts removed.

Figure 9:
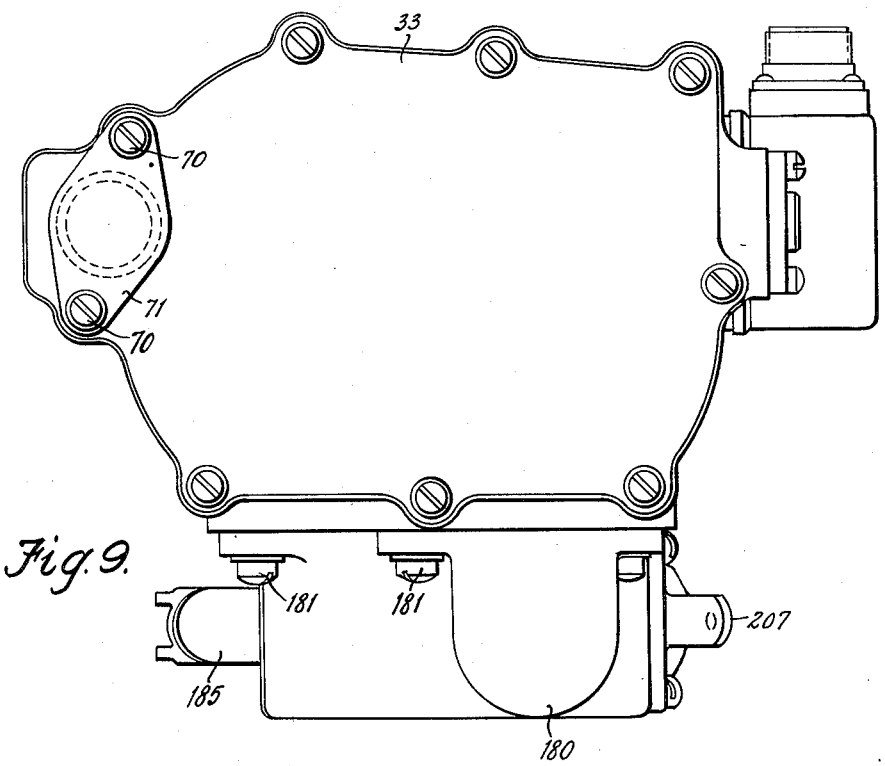

Fig. 9 is a top view of the controller.

Figure 10:
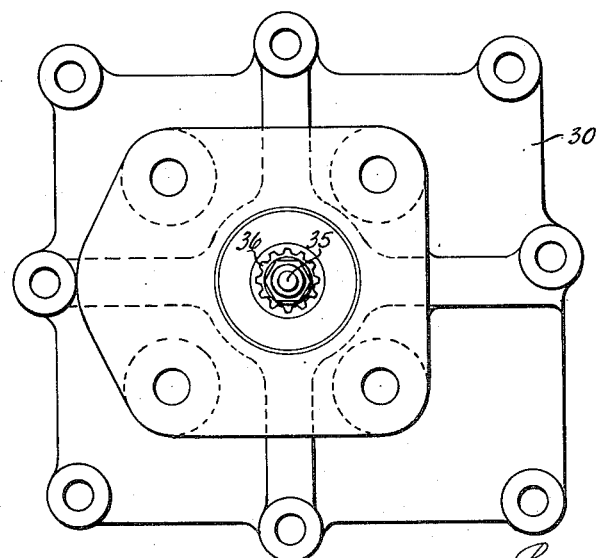

Fig. 10 is a bottom view of the supporting bracket of the controller.

Figure 11:
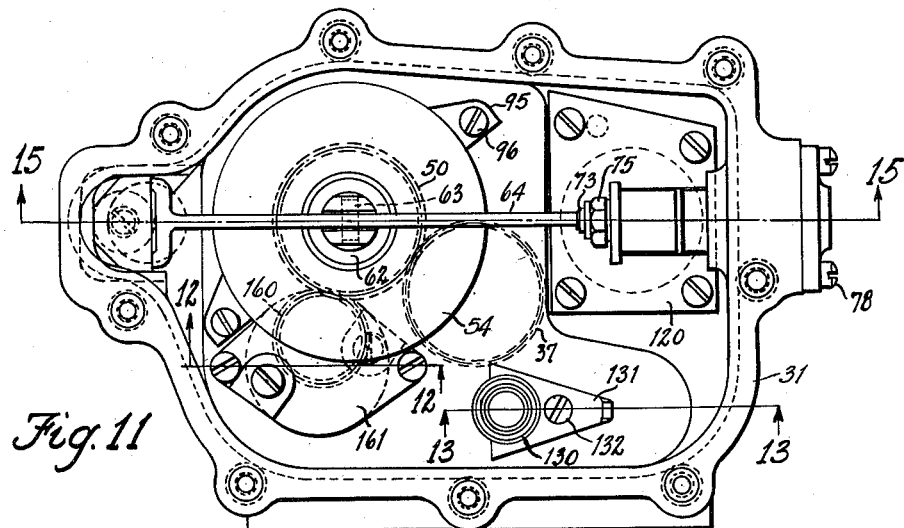

Fig. 11 is a top view with the top cover removed.

Figures 12, 13:
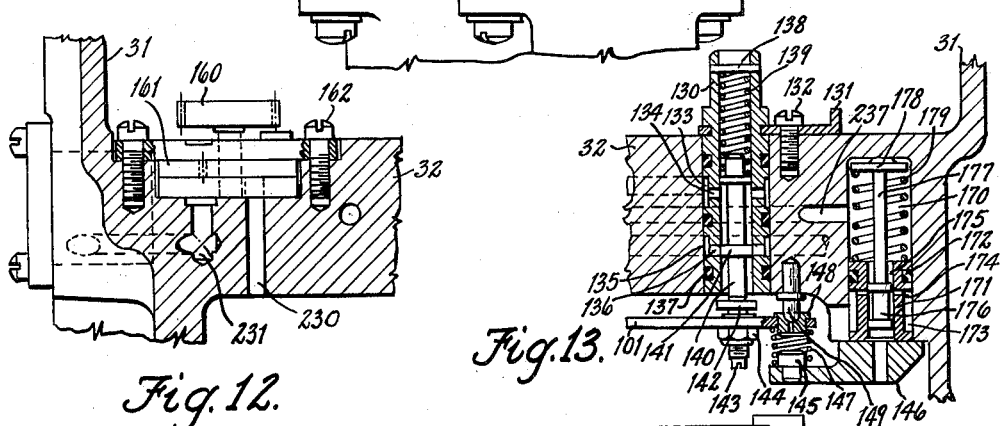

Figs. 12 and 13 are sectional views on lines 12—12 and 13—13 respectively of Fig. 11.

Figure 14:
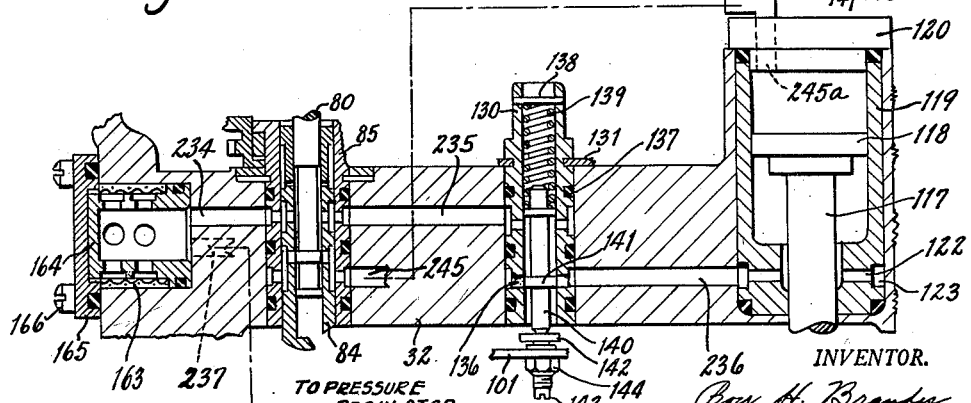
Figures 15, 16:
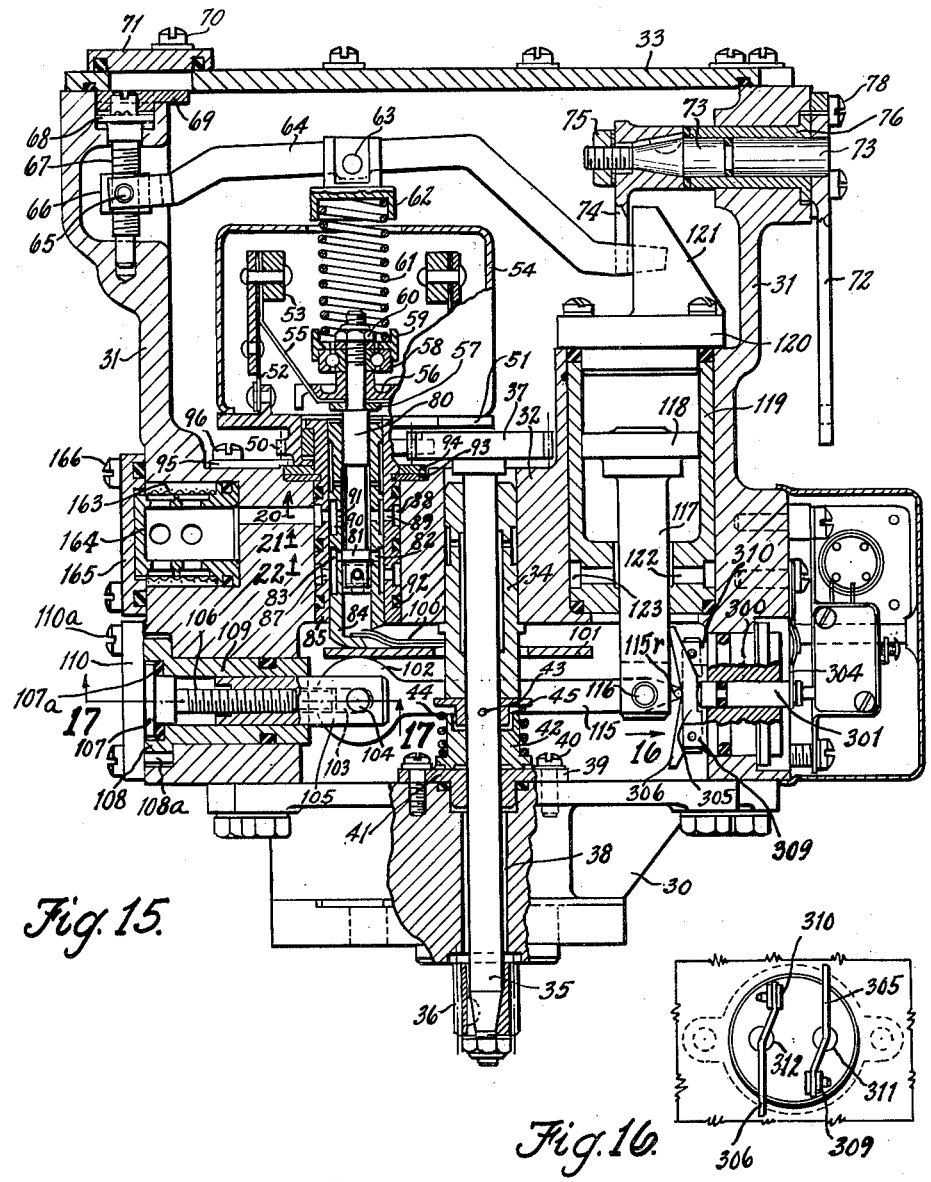

Fig. 14 is a diagrammatic composite of various sectional views included in Figs. 13 and 15.

Fig. 15 is a sectional view on line 15—15 of Fig. 11.

Fig. 16 is a fragmentary view in the direction of arrow 16 of Fig. 15.

Figure 17:
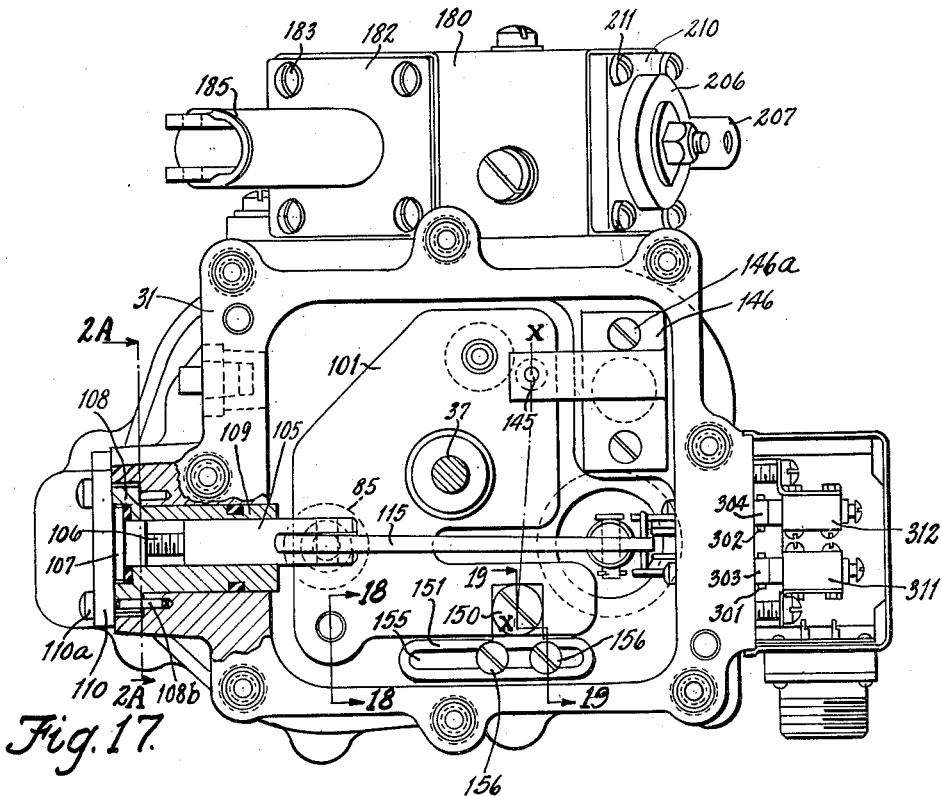

Fig. 17 is a bottom view with the bottom bracket removed, the part in section being on line 17—17 of Fig. 15.

Figure 18:
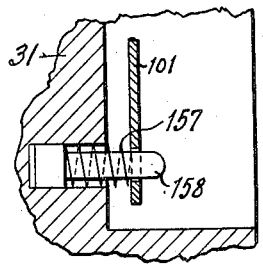
Figure 19:
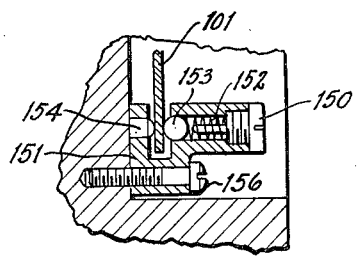

Figs. 18 and 19 are sectional views respectively on lines 18—18 and 19—19 of Fig. 17.

Figure 21:
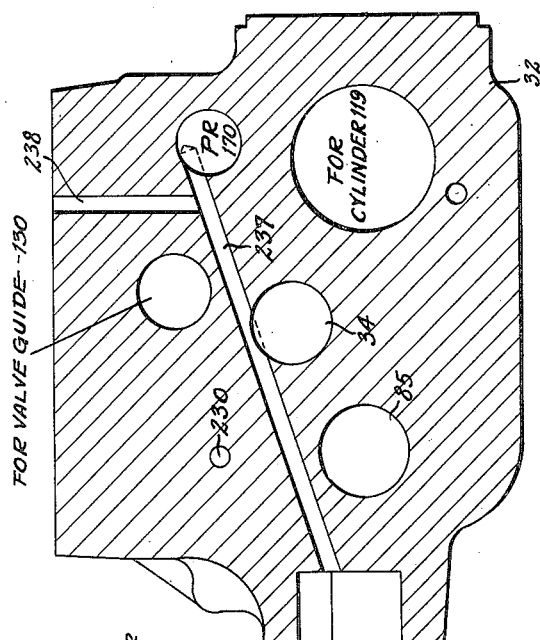
Figure 22:
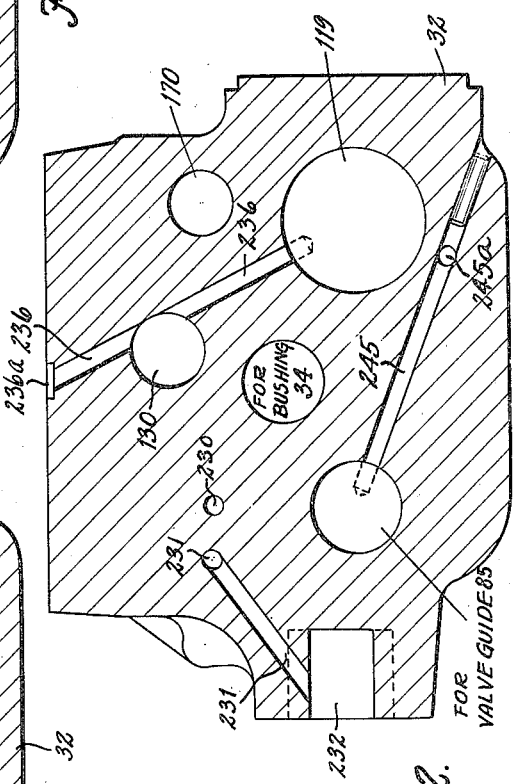
Figure 20:
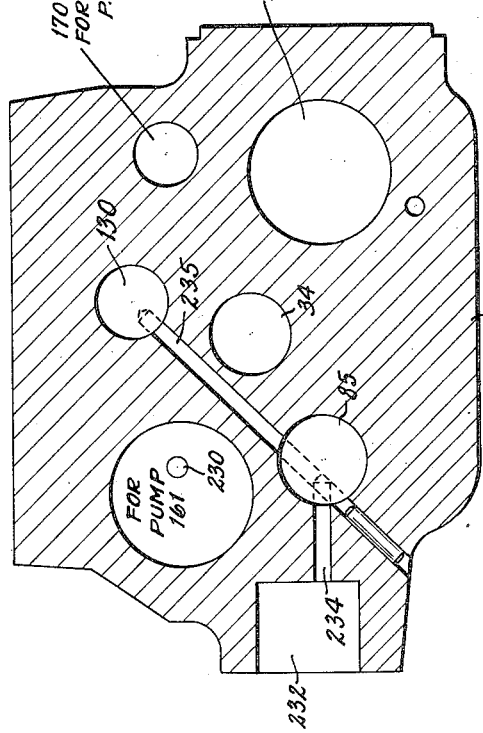

Figs. 20, 21 and 22 are respectively sectional views on lines 20—20, 21—21 and 22—22 of the housing 31 in Fig. 15.

Fig. 23 is a diagram of the controller.

Referring to Figs. 11 and 15, a base bracket 30 supports and provides the bottom cover for a housing 31 having a partition 32 and closed at the top by a cover 33. Partition 32 supports a bushing 34 for a shaft 35 driven by the engine through a gear 36 and driving a gear 37. The hole 38 in the bracket 30 is sealed by ring 39 attached by screws 40 to bracket 30 and having an annular flange 41 engaged by a rotary seal ring 42 driven by the shaft 35 through member 43 pinned thereto and urged against flange 41 by a spring 44 pressing against a washer 45 engaging the bushing 34.

Gear 37 meshes with gear 50 (also Fig. 11) integral with a plate 51 which is connected by leaf spring hinges 52 with weights 53 enclosed by a guard 54 attached to plate 51. Weights 53 are connected by a flexible stirrup 55 with a disc 56 surrounding a valve 80 which extends also through a member 57, the stirrup 55, the inner race of ball bearing 58, a spring cup 59, all these parts being retained in assembly by a nut 60 threaded on the upper end of valve 80.

Spring 61 is confined under compression between cup 59 and a cup 62 which pin 63 attaches to a lever 64 fulcrumed on pins 65 extending from a nut 66 threaded on a screw 67 having a radially serrated flange 68 engageable with similar serrations of a plate 69 retained by cover 33 on the housing 31. By removing screws 70 and cover 71, access is had to the head of screw 67. By applying a screwdriver thereto, the screw 67 can be turned to change the vertical location of the nut 66. As the screw 67 is turned, it is cammed down by virtue of the serrations of its flange and of the plate 69 and then moves back under the action of spring 61 to fully reengage the serrations which hold the screw in a required position for initial adjustment of the compression of spring 61.

Figure 1:
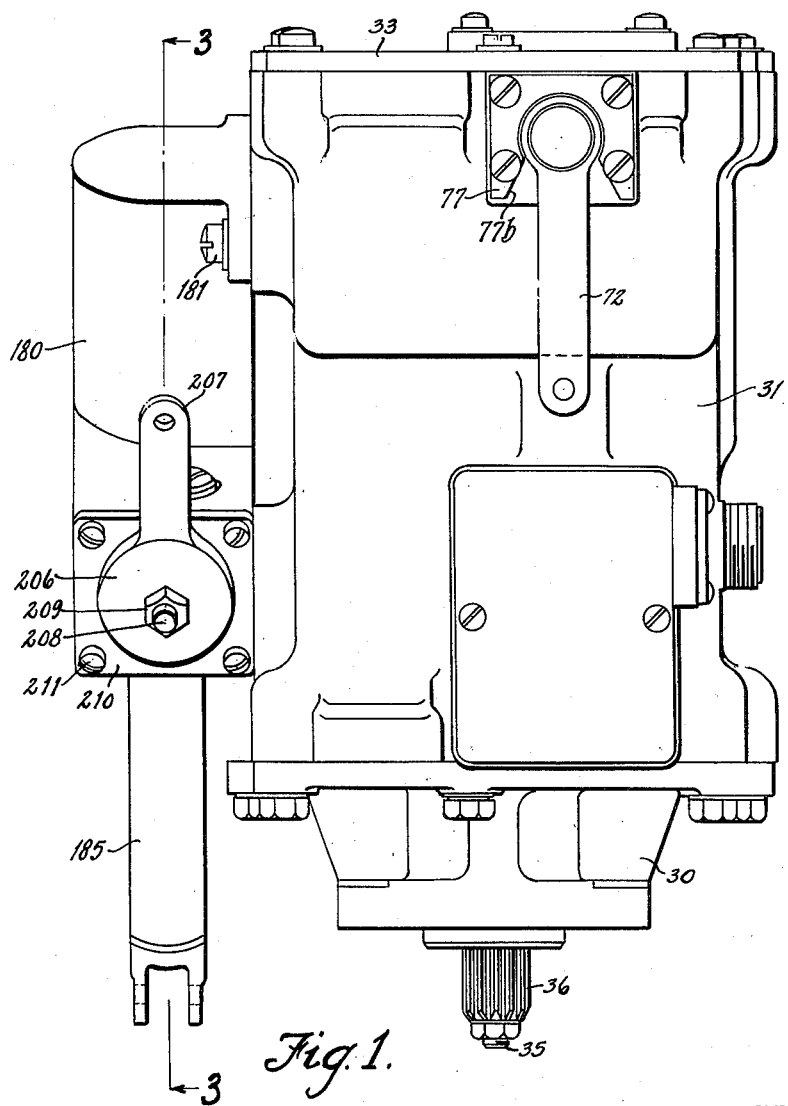
Fig. 1 is a view of one side of the controller.

The speed setting of the controller is effected by movement of lever 64 about its fulcrum pins 65, said movement being effected by the pilot who manually operates a lever 72 attached to a shaft 73 which is connected with a cam lever 74 which engages the lever 64. Nut 75 retains the lever 74 on the shaft 73. Shaft 73 is journaled in a bushing 76 supported by the housing 31 and its movement is limited by engagement of lever 72 with stops 77b (Fig. 1) of a plate 77 which screws 78 attach to housing 31.

Valve 80 has a land 81 which controls ports 82 connecting with a groove 83 of a sleeve valve 84 which is movable in a valve guide 85 having ports 87 connecting groove 83 of valve 84 with its own port 87. Guide 85 has a groove 88 which ports 89 connect with a groove 90 of valve 84 and ports 91 connect the groove 90 with the interior of valve 84. A C-washer 93 is received by a groove of guide 85 which together with a washer 94 is received by a pocket in partition 32. These washers and guide 85 are retained by a plate 95 which screws 96 attach to the partition 32. Guide 85 supports seal rings 92.

The open lower end of valve 84 (Fig. 15) has a drain opening which receives a leaf spring 100 attached to a plate 101. Spring 100 urges the valve 84 against the plate 101 and a spring to be described urges the plate 101 against a disc 102 having a notch 103 which receives a pin 104 carried by a nut 105 threaded on a screw 106 having a slotted head 107 (Fig. 2) received by a pocket in the flange 108 of a bushing 109 rotatably supported by the housing 31. The hole in the bushing 109 which receives the nut 105 is eccentric to the axis of rotation of the bushing.

Before making adjustments of the screw 106 and bushing 109, a cover 110 attached to the housing 31 by screws 110a is removed. When the bushing 109 is turned, the screw 106 and nut 105 are bodily adjusted vertically as viewed in Fig. 15 for the purpose of vertically adjusting the sleeve valve 84 so that its ports 82 will be blocked by the land 81 of valve 80 when the engine which drives the governor is on speed. To retain the bushing 109 in the desired position of adjustment, its flange 108 has notches 108a (Fig. 15) differing in number by one from the number of holes 108c (Fig. 2A) in the housing 31. One of the notches 108a will be located in alignment with or relative close to alignment with a hole 108c. If not exactly in alignment, the bushing 109 can be turned to bring the nearly aligned notch 108a into exact alignment with that hole 108c without causing ports 82 of valve 84 to be unblocked by valve land 81. Then the pin 108b (Figs. 2A and 17) is pushed through the aligned notch and hole.

When the pin 104 is in the position shown in Fig. 15 and disc 102 is moved about the pin 104 as a fulcrum by means to be described, substantially no movement of the valve 84 can take place. By turning the screw head 107 clockwise (Fig. 2) the pin 104 is initially adjusted to the left of the position shown in Fig. 15 into a position such that movement of disc 102 about the fulcrum pin 104 will effect the required amount of movement of valve 84. When the pin 104 is in the desired position of adjustment, the cover 110 is attached to the housing 31 in order to press the screw head 107 against a friction washer 107a which prevents rotation of the screw 106 and in order to retain the pin 108b.

The purpose of the adjustment stated in the preceding paragraph is to locate, in a required relation to valve 84, the fulcrum of a lever 115 of which the disc 102 is a part. Lever 115 is connected by pin 116 with a rod 117 connected to a piston 118 in a cylinder 119 which a cover 120 retains in a pocket provided by the housing. As will be explained later, piston 118 moves when there is a speed change which causes valve 80 to move its land 81 out of alignment with ports 82 of valve 84, and piston 118 moves in a direction to cause valve 84 to follow up valve 80 until ports 82 are closed by valve land 81. The location of pin 104 determines how much movement of piston 118 is required to bring valve 84 into port blocking position. The greater the movement required of piston 118 to bring valve 84 into port blocking position relative to valve 80, the lesser will be the sensitivity of the governor to acceleration or rate of change of speed error. Cover 120 provides a guide 121 for the free end of lever 64. The upper end of the cylinder 119 is connected with hydraulic circuits by a duct to be described in the cover. The lower end of cylinder 119 is connected with hydraulic circuits by holes 122 and annular groove 123 in the cylinder.

Referring to Fig. 13, the partition 32 receives a valve guide 130 retained by a plate 131 which a screw 132 attaches to the partition. Guide 130 has grooves 133 and 135 which ports 134 and 136 respectively connect with the interior of the guide. Guide 130 supports seal rings 137 and receives a pin 138 which retains a spring 139 which urges downward a valve 140 having a land 141 which controls ports 136 of guide 130. The lower end of valve 140 engages a pad 142 of a screw 143 threaded through plate 101 and locked in the desired position of adjustment by a nut 144.

Plate 101 is fulcrumed on a line x—x (Fig. 17) connecting the center of a stud 145 with the center of a screw 150. Stud 145 attached to a bracket 146 (which screws 146a attach to the partition 32) is surrounded by a spring 147 (Fig. 13) which surrounds a bushing 148 attached to plate 101. Bushing 148 provides a hemi-spherical socket for receiving the like-shaped end of stud 149 attached to the partition. Spring 147 urges the plate 101 against the stud 149. Screw 150 (Fig. 19), attached to a bracket 151, retains a spring 152 which urges a ball 153 against the plate 101 and the latter against a pin 154 carried by the bracket 151. Bracket 151 has a slot 155 which receives screws 156 which are threaded into the partition. By loosening these screws, the bracket 151 can be shifted horizontally in Fig. 17 to vary the relation of fulcrum line x—x to the sleeve valve 84 for a purpose to be described. Fig. 18 shows a spring 157 surrounding a stud 158 mounted in the partition and extending through the plate 101. This spring 157 urges plate 101 against the disc 102 of lever 145 (Fig. 15).

Gear 50 drives a gear 160 which drives a gear pump 161 retained in a pocket of the partition 32 (Fig. 12) by screws 162. The pump has an inlet 230 connected with the oil supply within the housing above and below the partition. The pump outlet 231 is connected with a filter pocket 232 (Figs. 14 and 20) containing a filter 164 which a cover 165, secured by screws 166 to the housing, retains in the pocket. Oil is filtered as it passes into the interior of the filter which is connected with ducts 234 and 237 (Figs. 14, 20 and 21). Duct 237 leads to a partition pocket 170 (Figs. 13 and 21) which receives parts of a pressure regulator including a valve sleeve 171 having a seal ring 172 and a groove 173 which ports 174 connect with the cylindrical bore 175 which receives a piston valve 176 whose stem 177 carries a disc 178 which retains a spring 179. When the pressure in pocket 170 exceeds a certain value, valve 176 moves down to open ports 174 to permit oil to escape to the tank or reservoir provided by the housing. Bracket 146 retains sleeve 171.

Referring to Figs. 3–8, a casting 180 attached to housing 31 by screws 181 receives a cylinder 182 secured by screws 183 surrounding a piston 184 connected with a rod 185 which actuates a blade-pitch setting device (not shown). As disclosed in the copending application of Muzzey and Carson, Serial No. 19,714, filed April 8, 1948, the blade-pitch setting device controls mechanism in the propeller hub which turns the blades to the angles demanded by the setting device. The piston rod end of cylinder 182 is connected with duct 240 which is connected by oppositely opening check valves 190 and 191 (Fig. 23) with a duct 239. The valves 190 and 191 are located in cages 192 and 193 respectively having restricted passages 194 and 195 respectively and received by pockets 196 and 197 respectively. Ducts 239 and 240 are each closed at one end by a plate 210 attached by screws 211 to casting 180, and are each connected with a pocket 198 in the casting (Figs. 5–8). Pocket 198 receives a valve guide 199 having ports 200 and 201 connected respectively with ducts 240 and 239, said ducts being separated by a seal 202. Guide 199 receives a valve 203 which a spring 204 urges toward a cam 205 provided by hub 206 of lever 207 pivotally supported by a stud 208 attached to plate 210 and retained by a nut 209. When lever 207 is in the position shown in Fig. 4, or in the position 207' (dotted lines in Fig. 23), the valve 203 is in position for connecting ducts 239 and 240 and the check valves 190, 191 and restrictions 194, 195 are by-passed and flow into or out of the rod end of cylinder 182 is not retarded. When lever 207 is moved counterclockwise (Fig. 4) or clockwise in Fig. 23 to full-line position 207, the valve 203 (Fig. 5) moves down to close the by-pass and restriction of fluid flow into and out of the rod end of cylinder 182 is provided. Lever 207 is manually operated between these positions so that the pilot can select either slow or fast operation of the blade pitch setting piston rod 185. Movement of lever 207 is limited by a pin 212 attached to plate 210 and engaging a slot 213 in the lever hub 206. The restrictions 194 and 195 can be different in size so that retardation of movement in the two directions will be different.

Referring to Figs. 20–23, tank T, which represents the oil reservoir in the housing 31, is connected by duct 230 with the inlet of pump 161 whose outlet is connected by duct 231 with filter pocket 232 whose outlets are connected with ducts 234 and 237. Duct 237 connects with the pressure regulator PR and with duct 238 which connects with duct 239. Duct 234 connects with port 88 of valve guide 85 and with duct 235 connected with port 134 of valve guide 130. Port 86 of valve guide 85 is connected by ducts 245 and 245a (in cover 120, Fig. 15) with the upper end of stabilizer cylinder 119. The lower end of cylinder 119 is connected by duct 236 with port 136 of valve 130 and with duct 236a connected with the upper end of cylinder 182.

When there is no speed error, valves 140, 80 and 84 and stabilizer piston 118 are in equilibrium position shown and there is no movement of servo-piston 184. If there is underspeed error, valve 80 moves down and the upper end of cylinder 119 receives pressure fluid and piston 118 moves down and valve 84 moves down. Since valve 84 operates as a follow-up, the downward displacements of piston 118 and valve 84 are proportional to the amount of speed error. As valve 84 moves down, valve 140 moves down and its displacement is proportional to the amount of speed error. The rate of displacement of piston 118 is proportional to the rate of change of speed error and fluid flows out through ducts 236 and 236a to the top cylinder 182 at a rate proportional to the rate of change of speed error. When valve 140 moves down, duct 236 is connected with the pump, and fluid flows out port 136 into duct 236 at a rate proportional to displacement of valve 140 which is proportional to speed error. Therefore the combined rate of flow through duct 236a is in proportion to speed error and to the rate of change of speed error. Rod 185 moves down to effect blade angle decrease at a rate proportional to speed error and rate of change of speed error. The underspeed error is connected by a stabilized governing action.

When there is overspeed error, the action is reversed. Upward movement of valve 80 is accompanied by upward movements of piston 118, valve 84 and valve 130. The upper end of cylinder 119 is connected with drain through duct in the lower end of valve 84; and the upper end of cylinder 182 is connected with drain through port 136 of valve guide 130. As piston 118 moves up at a rate proportional to rate of change of speed error, fluid will flow from the upper end of cylinder 182 at that rate through ducts 236a and 236 into the lower end of cylinder 119. Since the upward displacement of valve 140 is proportional to speed error, fluid will flow from the upper end of cylinder 182 through port 136 at a rate proportional to the amount of speed error. Therefore the combined flow rate from the upper end of the cylinder 182 is in proportion to speed error and the rate of change of speed error, while the piston 184 is moving up under the oil pressure underneath. Therefore rod 185 moves to effect blade angle increase at a rate proportional to speed error and the rate of change of speed error.

Although movement of rod 185 is retarded when lever 207 is in the full line position or is not retarded when the lever is at 207', the rate of movement of rod 185 is still proportional to speed error and to the rate of change of speed error. Its rate of movement can be represented by $$k_1 n + k_2 \dot{n}$$

in which $n$ is speed error and $\dot{n}$ is rate of change of speed error and $k_1$ and $k_2$ are factors which can be altered by the adjustments which have been described. The adjustment of fulcrum 104 by screw 107, known as the acceleration rate adjustment, determines $k_2$. The adjustment of the fulcrum of lever-plate 101 by bracket 151, known as the error rate adjustment determines $k_1$. By altering these factors, the apparatus can be adjusted to give the required governing action for a particular engine.

Referring to Figs. 15, 16, 17 and 23, a plug 300 received by a hole in housing 31 guides rods 301 and 302 urged left (Fig. 15) by springs 303 and 304, respectively (Fig. 17), against levers 305 and 306 pivoted at 307 and 308 respectively on ears 309 and 310, respectively, provided by the plug. Levers 305 and 306 are engaged by a rod 115r carried by lever 115. In the equilibrium position of rod 117, both switches 311 and 312 are open. When, as result of underspeed, rod 117 moves up from equilibrium position, lever 305 is moved clockwise (Fig. 15) to push rod 301 right to close normally open switch 311. When, as result of overspeed, rod 117 moves down from equilibrium position, lever 306 moves counterclockwise (Fig. 15) to push rod 302 right to close normally open switch 312. The closing of switches 311 and 312 (Fig. 17) will effect operation of devices (such as lamps) for indicating underspeed and overspeed, respectively. The switch operating means and not the indicating system as a whole is a part of the present invention.

The present controller is suitable for use with an internal combustion turbine and propeller power plant for airplanes. Power output being a function of the torque and the speed, the output can be varied by control of fuel (not shown) and the speed can be varied by adjusting the governor spring 61 through the lever 72. If, under cruise conditions, increase of power by increase of speed as well as increase of fuel is desired suddenly and the spring 61 is suddenly compressed by lever 72, the valve 80 is suddenly forced down from its equilibrium position with the result that blade angle would be suddenly reduced and then there would be a "false" or over acceleration. If valve lever 207 is in position 207' (Fig. 23), the by-pass around the restrictions 194, 195 will be closed so that piston 184 will respond slowly to the demands of the governor, and "false" acceleration will be substantially reduced. Under full power conditions when quicker response by the governor to correct speed error is required, the by-pass valve lever is moved to position 207 (Fig. 23) so that the by-pass around the restrictions 194, 195 will be open.

While the embodiment of the present invention as herein disclosed, constitutes a preferred form, it is to be understood that other forms might be adopted, all coming within the scope of the claims which follow.

What is claimed is as follows:

1. Apparatus for controlling blade angle comprising an hydraulic servo having a cylinder, a piston therein and a rod connected with the piston and extending through one end of the cylinder and connectible with blade angle changing mechanism, a fluid reservoir, a pump connected with the reservoir for supplying fluid under pressure, means connecting the pump with the rod end of the servo-cylinder, a flyweight governor, means for driving the pump and governor, a stabilizer cylinder, a piston therein, a rod extending from the piston through one end of said cylinder, a lever connected with said stabilizer piston rod, a fulcrum for said lever, a duct connecting one end of the stabilizer cylinder with the head end of the servo-cylinder, means for controlling admission of pressure fluid from the pump to the other end of the stabilizer cylinder or the draining thereof and comprising a valve connected with the governor and a follow-up valve operated by the lever, means for controlling admission of pressure fluid from the pump to the head end of servo-cylinder or the draining thereof and comprising a third valve and a second lever operated by the first lever for operating said third valve and a fulcrum for the second lever, a non-rotatable nut supporting the first lever fulcrum, means for adjusting the nut laterally in the direction of movement of the follow-up valve, and a screw for moving the nut axially.

2. Apparatus for controlling blade angle comprising an hydraulic servo having a cylinder, a piston therein and a rod connected with the piston and extending through one end of the cylinder and connectible with blade angle changing mechanism, a fluid reservoir, a pump connected with the reservoir for supplying fluid under pressure, means connecting the pump with the rod end of the servo-cylinder, a flyweight governor, means for driving the pump and governor, a stabilizer cylinder, a piston therein, a rod extending from the piston through one end of said cylinder, a lever connected with said stabilizer piston rod, a fulcrum for said lever, a duct connecting one end of the stabilizer cylinder with the head end of the servo-cylinder, means for controlling admission of pressure fluid from the pump to the other end of the stabilizer cylinder or the draining thereof and comprising a valve connected with the governor and a follow-up valve operated by the lever, means for controlling admission of pressure fluid from the pump to the head end of servo-cylinder or the draining thereof and comprising a third valve and a second lever operated by the first lever for operating said third valve and a fulcrum for the second lever, means for supporting the bushing for rotation on axis transverse to the direction of movement of the follow-up valve, means for securing the bushing in the desired angular position in order to adjust the nut and the first lever fulcrum laterally in the direction of movement of the follow-up valve, means for preventing rotation of the nut and a screw for moving the nut in order to adjust the first lever fulcrum transverse to the direction of movement of the follow-up valve.

3. Apparatus for controlling blade angle comprising an hydraulic servo having a cylinder, a piston therein and a rod connected with the piston and extending through one end of the cylinder and connectible with blade angle changing mechanism, a fluid reservoir, a pump connected with the reservoir for supplying fluid under pressure, means connecting the pump with the rod end of the servo-cylinder, a flyweight governor, means for driving the pump and governor, a stabilizer cylinder, a piston therein, a rod extending from the piston through one end of said cylinder, a lever connected with said stabilizer piston rod, a fulcrum for said lever, a duct connecting one end of the stabilizer cylinder with the head end of the servo-cylinder, means for controlling admission of pressure fluid from the pump to the other end of the stabilizer cylinder or the draining thereof and comprising a valve connected with the governor and a follow-up valve operated by the lever, means for controlling admission of pressure fluid from the pump to the head end of servo-cylinder or the draining thereof and comprising a third valve and a second lever operated by the first lever for operating said third valve and a fulcrum for the second lever, a cylindrical nut supporting the first lever fulcrum, means for preventing rotation of the nut, a rotatable bushing having a hole which receives the nut and which is eccentric to the bushing axis and parallel thereto, a screw having a head by which it is turned in order to move the nut axially, and the first lever fulcrum in a direction transverse to the direction of movement of the follow-up valve, said bushing having a flange which surrounds a recess of the bushing and which receives the head of the screw, a member providing a cylindrical opening in which the bushing is journaled and a recess receiving the flange of the bushing, said opening being on an axis transverse to the direction of movement of the follow up valve, whereby rotation of the bushing in said bearing causes the adjustment of the second lever fulcrum in the direction of movement of the follow up valve and whereby axial movement of the nut effected by turning the screw causes movement of the first lever fulcrum in a direction transverse to the direction of movement of the follow up valve, means for securing the bushing to the member in a position of adjustment, and a cover attached to the member for retaining the bushing in said member and engaging the screw head to clamp it to the bushing in a position of axial adjustment of the screw.

4. Apparatus for controlling blade angle comprising an hydraulic servo having a cylinder, a piston therein, and a rod connected with the piston and extending through one end of the cylinder and connectible with blade angle changing mechanism, a fluid reservoir, a pump connected with the reservoir for supplying fluid under pressure, means connecting the pump with the rod end of the servo-cylinder, a flyweight governor, means for driving the pump and governor, a stabilizer cylinder, a piston therein, a rod extending from the piston through one end of said cylinder, a lever connected with said stabilizer piston rod, a fulcrum for said lever, a duct connecting one end of the stabilizer cylinder with the head end of the servo-cylinder, means for controlling admission of pressure fluid from the pump to the other end of the stabilizer cylinder or the draining thereof and comprising a valve connected with the governor and a follow-up valve operated by the lever, means for controlling admission of pressure fluid from the pump to the head end of servo-cylinder or the draining thereof and comprising a third valve and a second lever operated by the first lever for operating said valve and a fulcrum for the second lever, electric switches respectively for controlling devices which respectively indicate overspeed and underspeed, and having actuators movable in direction transverse to the direction of movement of the stabilizer piston, means for causing movement of one actuator in response to movement of the stabilizer piston in one direction immediately away from equilibrium position and means for causing movement of the other actuator in response to movement of the stabilizer piston in the other direction immediately away from equilibrium position.

5. Apparatus for controlling blade angle comprising an hydraulic servo having a cylinder, a piston therein, and a rod connected with the piston and extending through one end of the cylinder and connectible with blade angle changing mechanism, a fluid reservoir, a pump connected with the reservoir for supplying fluid under pressure, means connecting the pump with the rod end of the servo-cylinder, a flyweight governor, means for driving the pump and governor, a stabilizer cylinder, a piston therein, a rod extending from the piston through one end of said cylinder, a lever connected with said stabilizer piston rod, a fulcrum for said lever, a duct connecting one end of the stabilizer cylinder with the head end of the servo-cylinder, means for controlling admission of pressure fluid from the pump to the other end of the stabilizer cylinder or the draining thereof and comprising a valve connected with the governor and a follow-up valve operated by the lever, means for controlling admission of pressure fluid from the pump to the head end of servo-cylinder or the draining thereof and comprising a valve and a second lever operated by the first lever for operating said valve and a fulcrum for the second lever, electric switches respectively for controlling devices which respectively indicate overspeed and underspeed and having actuators in a plane transverse to the axis of the stabilizer piston, a member movable with said piston, and two levers respectively engaging the actuators and pivoted on axes respectively on opposite sides of the plane of the actuators, said levers having edge surfaces normally engaged by the member and said edge surfaces having portions oblique to the axis of the stabilizer piston and extending in opposite directions from said member and toward said piston whereby the switch actuators are respectively moved immediately in response to movements of the piston away from equilibrium position.

ROY H. BRANDES.

REFERENCES CITED

The following references are of record in the file of this patent:

UNITED STATES PATENTS

| Number | Name | Date |
|---|---|---|
| 1,891,096 | Kraft | Dec. 13, 1932 |
| 1,933,311 | Caughey | Oct. 31, 1933 |
| 1,976,659 | Dickinson | Oct. 9, 1934 |
| 2,197,743 | Crafts | Apr. 16, 1940 |
| 2,299,635 | McNeil | Oct. 20, 1942 |
| 2,328,451 | Hedman | Aug. 31, 1943 |

FOREIGN PATENTS

| Number | Country | Date |
|---|---|---|
| 7,548 of 1927 | Australia | Apr. 17, 1928 |